No. 663,808. Patented Dec. 11, 1900.
P. DIEHL.
REVOLVING HOOK SEWING MACHINE.
(Application filed Aug. 7, 1900.)
(No Model.) 2 Sheets—Sheet 1.
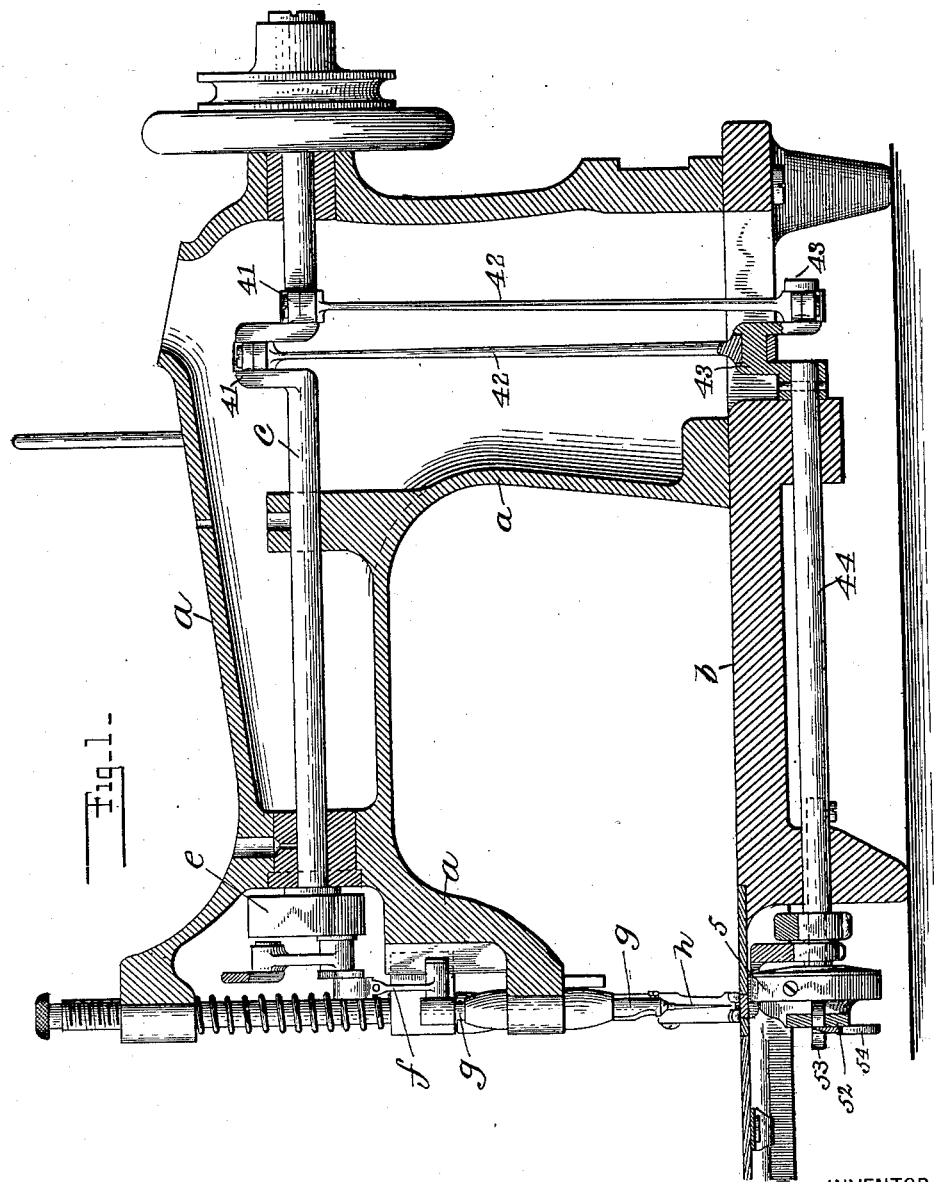
WITNESSES:
F. N. Roehrich
C. M. Sweeney
INVENTOR:
Philip Diehl
BY
Henry Calver
ATTORNEY.

No. 663,808. Patented Dec. 11, 1900.
P. DIEHL.
REVOLVING HOOK SEWING MACHINE.
(Application filed Aug. 7, 1900.)
(No Model.) 2 Sheets—Sheet 2.
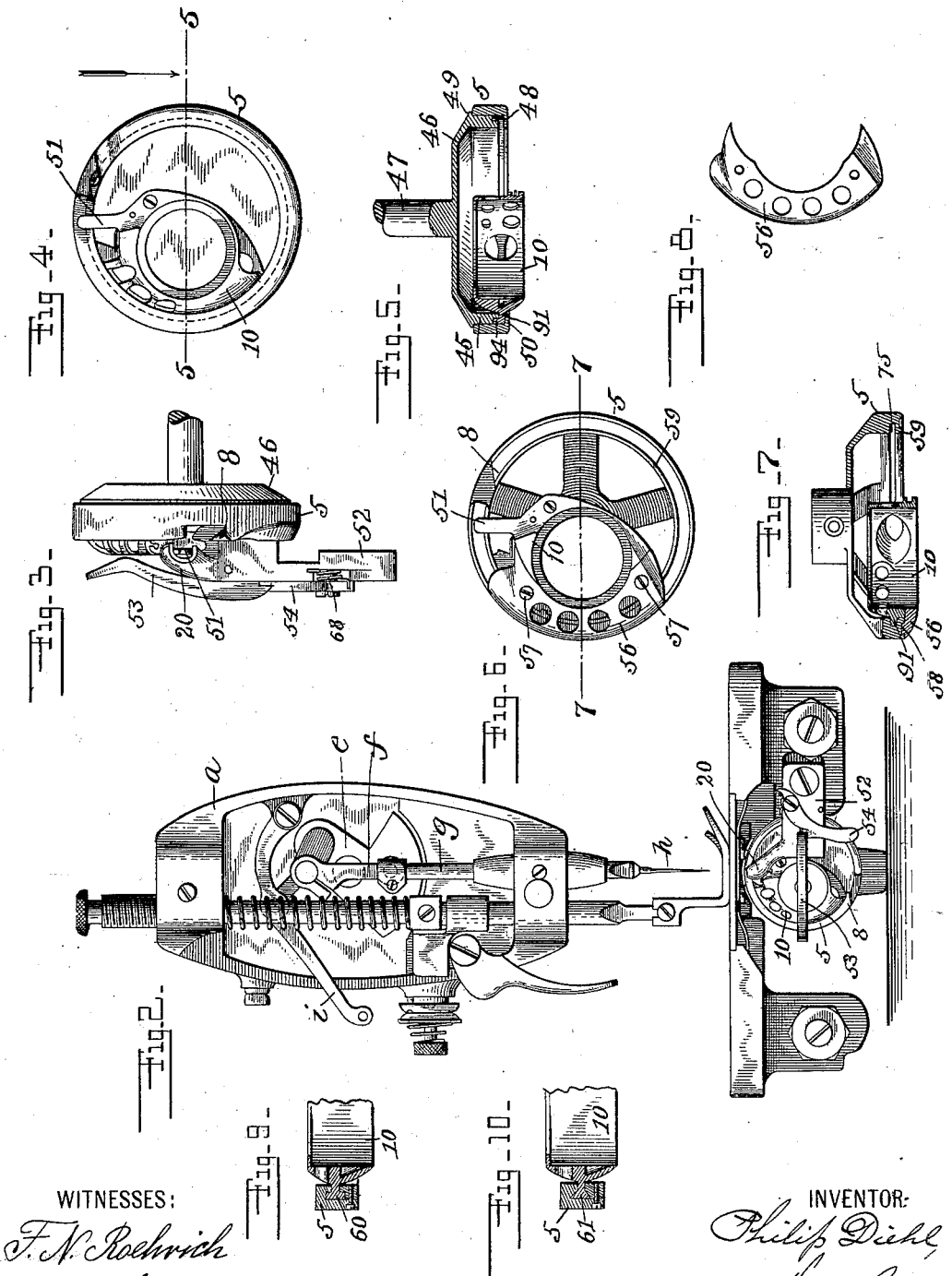
WITNESSES:
F. N. Roehrich
C. M. Sweeney
INVENTOR:
Philip Diehl,
BY Henry Calver
ATTORNEY.

UNITED STATES PATENT OFFICE.

PHILIP DIEHL, OF ELIZABETH, NEW JERSEY, ASSIGNOR TO THE SINGER MANUFACTURING COMPANY, OF NEW JERSEY.

REVOLVING-HOOK SEWING-MACHINE.

SPECIFICATION forming part of Letters Patent No. 663,808, dated December 11, 1900.

Application filed August 7, 1900. Serial No. 26,145. (No model.)

*To all whom it may concern:*

Be it known that I, PHILIP DIEHL, a citizen of the United States, and a resident of Elizabeth, in the county of Union and State of New Jersey, have invented certain new and useful Improvements in Revolving-Hook Sewing-Machines, of which the following is a specification, reference being had therein to the accompanying drawings.

This invention relates to that class of lockstitch sewing-machines in which the loops of needle-thread are carried around a stationary thread-case containing the lower or locking thread by a circularly-moving hook, the invention being of the same character generally as that embraced by my application, Serial No. 736,263, filed November 9, 1899, in that it comprises a thread-case which is supported by the circularly-moving hook and which is arranged eccentrically to the axis of the said hook, so that an early discharge of the loops of needle-thread around said thread-case is secured.

In the present invention a rotating movement in unison with the needle-bar-driving-shaft is preferably imparted to the hook-carrying shaft, so that said last-named shaft performs one rotation to each rotation of the said needle-bar shaft and at a uniform speed therewith. Also in the present invention the thread-case supported by the hook preferably has an interlocking rib-and-groove connection therewith, so that the use of a holder extending within the field of the hook is not required to maintain such connection and keep the peripheral segmental rib of the thread-case in its groove in the hook.

In the accompanying drawings, Figure 1 is a sectional view of a sewing-machine embodying the invention. Fig. 2 is a front end view thereof, the face-plate of the head being omitted in both views. Fig. 3 is a plan view of the hook and of the thread-case and bobbin-holder. Fig. 4 is a front face view of the hook and thread-case; and Fig. 5, a section of the same on line 5 5, Fig. 4. Figs. 6 and 7 are views similar to Figs. 4 and 5 of a modified construction, Fig. 7 being a section on line 7 7, Fig. 6. Fig. 8 is a detail view of the removable part of the thread-case shown in Figs. 6 and 9, and Figs. 9 and 10 are detail views illustrating other modifications of the interlocking connection between the hook and thread-case.

Referring to the drawings, $b$ denotes the work-plate, and $a$ the arm, of the machine. The rotating driving-shaft $c$ is journaled in the upper part of the arm and provided at its forward end with a crank $e$, connected by a pitman $f$ with the needle-bar $g$, carrying the usual eye-pointed needle $h$, the "link" take-up $i$ being also connected with said crank and operated thereby, as in some well-known forms of Singer machines.

The driving needle-bar shaft is provided near its rear end with two quartering-cranks 41, arranged at or about ninety degrees apart, said cranks being connected by two pitmen 42 to similar cranks 43 at the rear end of a rotating shaft 44 beneath the work-plate and provided at its forward end with the hook-ring or rotating hook 5, having on its front face a loop-seizing beak 8.

Peripherally supported by the hook 5 is the stationary thread-case 10, the perimeter of which in the preferred construction herein shown is provided with a segmental rib 91, formed L-shaped in cross-section, affording a small lateral lip 94. The hook-ring 5 is in the preferred construction removably attached to an annular flange 45, formed on a disk 46, having a spindle 47, entering the hollow forward end of the rotating shaft 44 and secured therein, said flange having at its front end a small gain 48, which receives the lateral lip 94 of the thread-case rib 91. The disk 46 has a small peripheral lip or flange 49, against which the inner edge of the hook-ring 5 abuts. The said hook-ring 5 is provided at its front end or face with an inwardly-extending lip or flange 50, which abuts against the outer side face of the thread-case rib 91, so as to hold the inner side face of said rib in contact with the outer end of the annular flange 45 of the disk 46, and thus retain the lateral lip 94 of said rib in the gain 48 of the flange 45. This construction just described affords an interlocking connection between the thread-case and the circularly-moving hook, so as to hold the said thread-case to its peripheral bearing in the hook by which it is supported, and thereby prevent radial displacement of said thread-case (which fills but a portion of the field of the hook) without necessitating the use of an independent holder for this purpose extending within the hook-ring or hook, as in the construction shown and described in my application hereinbefore referred to. The term "hook" as herein employed includes the hook-ring 5 and the disk 46, with its flange 45, by which said hook-ring is carried.

To restrain the thread-case 10 from moving with the hook by which said thread-case is supported and between which thread-case and hook there is necessarily a slight frictional contact at that peripheral edge of the thread-case which touches the hook, the said thread-case is provided with a rigid arm 51, engaging some adjacent stationary part, which in the present instance is the loop guiding and steadying arm 20, extending within the field of the hook and which to receive the said arm 51 of the thread-case is formed hollow on its inner side. The loop guiding and steadying arm 20 is formed as part of a bracket 52, attached to a lug or hanger on the work-plate of the machine, and will preferably be provided with a bobbin-retaining lever 53 and a locking-lever 54 therefor. These features of the bobbin holding and ejecting devices, however, form no part of the present invention and are not herein claimed, being fully described and claimed in the joint application of myself and Martin Hemleb, filed August 7, 1900, Serial No. 26,140.

The operation of the machine herein shown and described is essentially the same as that embraced by my application of November 8, 1899, hereinbefore referred to, in that by the employment of a stationary thread-case which is supported by the circularly-moving hook in a position eccentric to or mainly at one side of the axis of said hook an early cast-off or discharge in the rotation of the driving-shaft of the loops of needle-thread around the thread-case is secured, so as to leave plenty of time for the easy operation of the take-up and feed without requiring differential movements or double or treble rotations of the hook-shaft to the needle-bar-operating shaft or to each reciprocation of the needle-bar, as in some hook-machines heretofore in use. In the present machine the hook-shaft 44 has a uniform rotating movement as distinguished from an irregular or differential rotating movement, so that it performs the two halves of each complete excursion or the two halves of each complete rotary movement in equal times, and thus the objections to jerky differential movements, particularly at high speeds, are avoided, as well as the double or treble rotations above mentioned. In the formation of each stitch the needle descends, and as it rises its loop is taken by the beak of the rotating hook and carried around the stationary eccentrically-arranged thread-case and is in the construction herein shown discharged over the heel of said case within less than a half-rotation of said hook after the beak of the latter has taken the needle-loop. As soon as the hook reaches its cast-off or loop-discharging position (shown in Fig. 2) the take-up begins its pull on the needle-thread, and as the beak of the hook inclines tangentially inwardly or toward the axis of rotation of the hook from its throat to its point said beak when in cast-off position points slantingly upward in the general direction of the pull on the thread by the take-up, and thus the latter draws the thread-loop easily off from the beak of the hook and, acting quickly, tightens the said loop and completes the stitch before the next loop is taken by the hook and preferably while the needle is above the work-plate and at or near the top of its stroke.

The present invention is not to be understood as being limited to the details herein shown and described or to the combination, with a continuously-rotating hook, of a stationary thread-case supported by and having an interlocking connection with said hook, as a stationary thread-case held to its peripheral bearing in the hook by an independent holder extending within the field of the hook, as in the construction shown in my application of November 8, 1899, may be employed in connection with a continuously-rotating hook, or a stationary thread-case having an interlocking connection with the hook, and thus not requiring the independent holder referred to, may be employed in connection with the oscillating hook shown in my said application. Also the eccentric arrangement of the thread-chamber of the thread-case or bobbin-case with reference to the axis of rotation of the hook, although preferred, is not positively essential, as with a relatively large hook a thread-case or bobbin-case having a thread-chamber smaller relative to the size of the hook than in the construction herein illustrated, and which thread-chamber or bobbin-chamber is concentric with the axis of rotation of the hook, might be employed. The feature, however, which is essential to secure an early discharge of the loops of needle-thread around the thread-case which is supported by the hook is a comparatively small arc of contact between the periphery of the thread-case and the hook, and this at one peripheral edge only of said thread-case. In other words, to secure this early discharge of the loops of needle-thread around the hook the point of contact of the thread-case with the hook is preferably somewhat less than a half of a circle, commencing at the loop-taking position of the hook and extending in the direction in which the loop is carried by the hook in being spread over the thread-case or bobbin-case. This essential feature of the invention involves a thread-case having one peripheral edge which is curved in the true arc of a circle of which the axis of the rotating hook is the center, and which curved edge, preferably of somewhat less than half a circle in extent, is in supporting contact with said hook, the opposite edge of said thread-case being not thus curved, but being preferably of irregular outline, as shown, so that a free thread-passage, preferably across the field of the hook, is left between the last-named edge of said thread-case and said hook, thus affording an early discharge of the loops of needle-thread over the said thread-case and permitting an early tightening of the said loops of needle-thread by the take-up in advance of the travel of the rotating hook. Also the interlocking connection of the thread-case and hook may be effected in various ways. Thus instead of forming the hook in two parts, as hereinbefore described, with the hook-ring removable to permit the thread-case to be inserted in working position in the hook, the hook may be made in one piece and the thread-case in two pieces, as shown in Figs. 6 and 7. In this construction the hook 5 is provided with the interior annular groove 55, which receives the peripheral rib 91 of the thread-case, and said thread-case is provided with the segmental portion 56, removably secured thereto by screws 57 and having a small lip 58, slightly overhanging the annular lip 59, formed on the outer face of the hook-ring. In this construction the thread-case is placed in working position in the hook when the segment 56 is removed therefrom, and the said segment is then attached to the thread-case by the screws 57 to hold the thread-case in place interlocked with the hook against radial displacement. Other interlocking connections of the thread-case and hook might also be employed, as by forming the thread-case rib T-shaped in cross-section, as at 60, Fig. 9, or dovetail-shaped, as at 61, Fig. 10, and providing the hook-rings 5 with correspondingly-shaped grooves, portions of the hooks being preferably removable to permit the parts to be properly assembled.

Having thus described my invention, I claim and desire to secure by Letters Patent—

1. In a sewing-machine, the combination with a needle and its operating mechanism, of a continuously-rotating hook, a thread-case supported by said hook and having one peripheral edge, which is in supporting contact with the hook, curved to conform to the arc of a circle of which the axis of said hook is the center, and having its other edge not thus curved, so as to leave a free thread-passage between said hook and the last-named edge of said thread-case to afford an early discharge and tightening of the loops of needle-thread, means for restraining said thread-case from moving with said hook, a take-up and means for operating the same whereby each loop is drawn up to complete the stitch before the next loop is taken by the hook, and means for imparting a single regular and complete rotation to said hook to each reciprocation of the said needle.

2. In a sewing-machine, the combination with a needle and its operating mechanism, of a continuously-rotating hook, a thread-case supported by said hook and arranged eccentric to the axis of the latter and on that side of said axis toward which the needle-loops are first carried by said hook, said thread-case having one peripheral edge, which is in supporting contact with said hook, curved to conform to the arc of a circle of which the axis of said hook is the center, and its other edge not thus curved, means for restraining said thread-case from moving with said hook, a take-up and means for operating the same whereby each loop is drawn up to complete the stitch before the next loop is taken by the hook, and means for imparting a single regular and complete rotation to said hook to each reciprocation of said needle.

3. In a sewing-machine, the combination with a rotating needle-bar shaft and a needle-bar operatively connected therewith, of a rotating hook-shaft connected to the needle-bar shaft so as to rotate in unison or at the same speed therewith, a rotating hook carried by said hook-shaft, a stationary thread-case supported by the said hook and having one peripheral edge, which is in supporting contact with said hook, curved to conform to the arc of a circle of which the axis of said hook is the center, said thread-case having its other edge not thus curved, thus leaving a free thread-passage between said hook and the last-named edge of said thread-case, and means for restraining the movement of said thread-case with said hook.

4. In a sewing-machine, the combination with a rotating needle-bar shaft and a needle-bar operatively connected therewith, of a rotating hook-shaft connected to the needle-bar shaft so as to rotate in unison or at the same speed therewith, a rotating hook carried by said hook-shaft, and a stationary thread-case supported by said hook and arranged eccentric to or at one side of the axis of the latter on that side of said axis toward which the needle-loops are first carried by said hook, said thread-case having one peripheral edge, which is in supporting contact with said hook, curved to conform to the arc of a circle of which the axis of said hook is the center, said thread-case having its other edge not thus curved, and means for holding said thread-case stationary as the said hook rotates.

5. In a sewing-machine, the combination with a needle and its operating mechanism, of a circularly-moving hook, a stationary thread-case supported by and having at or near its periphery an interlocking connection with said hook of less than half a circle in extent to afford an early cast-off of the needle-loops, and held, by said connection, against radial displacement from its bearing in the hook, and means for restraining said thread-case from moving with said hook.

6. In a sewing-machine, the combination with a needle and its operating mechanism, of a circularly-moving hook, a thread-case supported by and having an interlocking connection with said hook so as to be held from radial displacement, said thread-case but partly filling the space or field inclosed by said hook and being arranged eccentric to the axis of the latter, so as to secure an early cast-off or discharge of the loops of needle-thread around or over said thread-case, and means for restraining the movement of said thread-case with said hook.

7. In a sewing-machine, the combination with a rotating shaft arranged above the work-plate and provided near its rear end with two cranks, a needle-bar operatively connected with the forward end of said shaft, a hook-shaft located below the work-plate and provided at or near its rear end with two cranks and at its forward end with a rotating hook, two pitmen connecting the cranks of said shafts, a stationary thread-case supported by said hook and arranged eccentric to the axis of the latter on the side of said axis toward which the loops of needle-thread are first carried by said hook, said thread-case having a comparatively short arc of contact with said hook, so as to secure an early discharge of the loops of needle-thread around said case, as described, and means for restraining said thread-case from moving with said hook.

In testimony whereof I affix my signature in presence of two witnesses.

PHILIP DIEHL.

Witnesses:
HENRY J. MILLER,
W. IRVING HOUGHTON.